Dec. 27, 1955     P. BUCHET     2,728,143
TAPE MEASURES
Filed Nov. 25, 1952
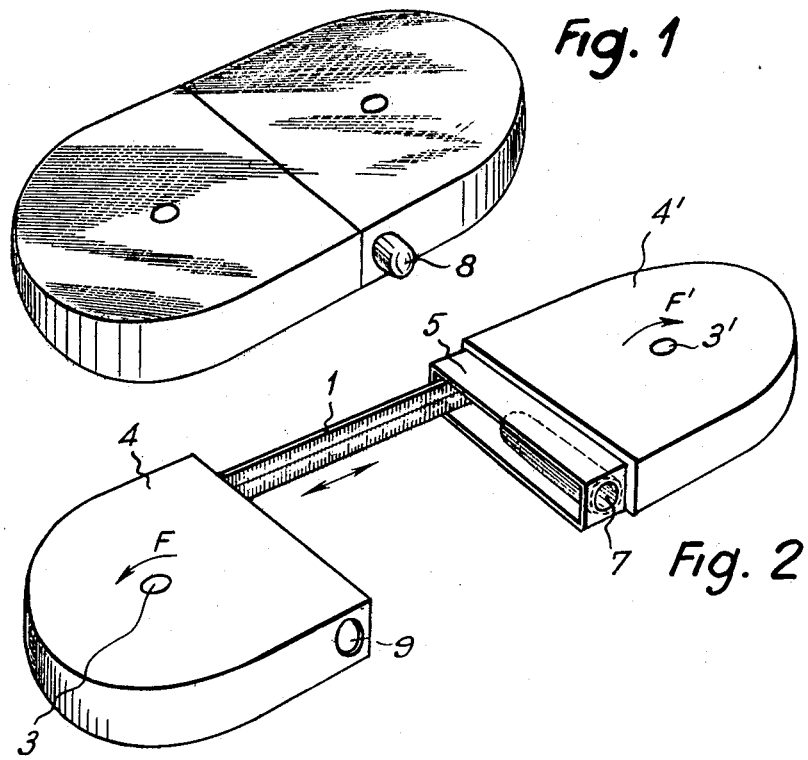
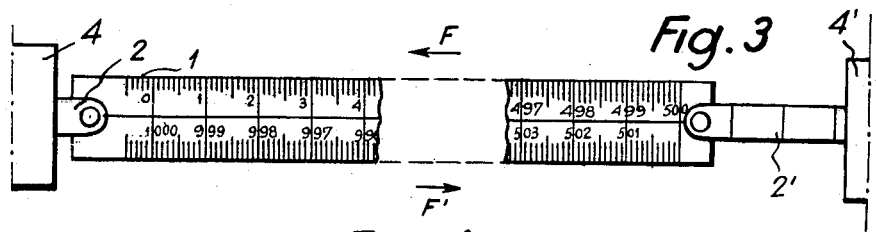
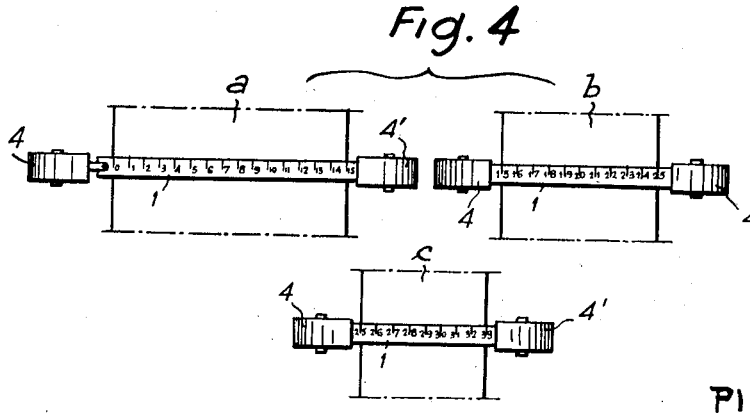
INVENTOR
PIERRE BUCHET
BY Haseltine, Laketh
AGENTS

United States Patent Office 2,728,143
Patented Dec. 27, 1955

2,728,143

TAPE MEASURES

Pierre Buchet, Melun, France

Application November 25, 1952, Serial No. 322,495

Claims priority, application France November 26, 1951

3 Claims. (Cl. 33—138)

This invention relates to tape measures, and more especially to improvements in tape measures of the self-coiling type in which a band or strip made of a suitable flexible material, which may be metal or a suitable plastic for example, and calibrated in units of length, is adapted to be coiled up automatically within a housing therefor under the action of a suitable spring or other coiling device.

It is an object of the invention to provide an improved self-coiling tape measure.

Another object is to provide a tape measure wherein the flexible measuring band is adapted to be taken up in either one of two opposite directions.

A further object is to provide a tape measure of the kind described whereby only a minimum length of the band need remain uncoiled for effecting a given measurement, thereby minimizing the danger of the band fouling an obstacle; kinking, getting damaged or unduly worn through dragging on the ground, and of other similar objectionable features inherent to conventional devices of a comparable kind.

A further object is to provide a self-coiling tape measure whereby a series of successive measurements can be conveniently carried out and a combined measurement obtained, without having at any time to uncoil a length of the measuring band or tape greater than that required for each successive measurement.

Further objects of the invention will appear as the disclosure proceeds.

Briefly, the invention provides an improved tape measure wherein the flexible band or tape has it opposite ends connected to a pair of separate coiling means, whereby it is adapted to be taken up on one coiling means progressively as it is uncoiled off the other. An exemplary embodiment of the invention is illustrated in the accompanying drawings wherein:

Fig. 1 is a perspective view of the tape measure in its coiled or inoperant condition;

Fig. 2 is a similar view of the tape measure as used in making a measurement;

Fig. 3 is a view on an enlarged scale with part of the tape broken away, illustrating a convenient form of calibration usable in connection with a tape measure according to the invention;

Fig. 4 illustrates one manner of using the improved tape measure for effecting a combined measurement.

As shown in the drawings, a flexible band or strip 1 is made of an appropriate flexible but inextensible material, such as a strip of metal having a slightly cambered cross section to impart flexibility thereto in a plane normal to the strip while maintaining substantial stiffness in the plane of the strip. The strip is calibrated in suitable units of length, such as metric units (as shown), or inches and feet, or possibly a logarithmic scale in certain special applications. The strip 1 has both ends thereof secured through flexible attaching elements 2, 2', to a pair of respective spring coiling means of any suitable well-known construction, not illustrated, mounted on pins 3, 3' and enclosed in housings 4, 4'. The coil springs of the two coiling means are so arranged as to tend at all times to coil the band in the respective directions indicated by the arrows F—F', whereby the housing elements 4 and 4' are at all times urged towards each other. Cooperating means may be provided on the housing elements to provide a fit therebetween in the fully coiled state of the device. Thus, a flange or extension 5 on one element (4') may be arranged to fit into the aperture of the other element 4. As shown, a locking arrangement is provided in the form of a recess or socket 7 housed within the flange portion 5, adapted to register in the coiled condition of the unit with a hole 9 in the other housing element, and a locking pin insertable into the hole and socket to lock the two housing elements with respect to each other.

The locking pin 8 may advantageously constitute a tracer point or pencil of any suitable type.

As shown in Fig. 4, the above described device can be very conveniently used where required to totalize a series of individual measurements, for example to obtain the combined width dimension of a set of planks of different widths but equal length in order to determine the total surface area of a number of such planks.

With the band completely coiled up within casing elements 4', the width of the first plank $a$ is measured off by unreeling a length of tape corresponding to the width of said first plank, e. g. 15 centimeters. This length is then coiled up in the casing element 4. The width of the next board $b$ is then measured off by starting from the end point (15 cm.) of the initial measurement and uncoiling from casing element 4' a length corresponding to the width of the second plank, e. g. 10 centimeters. The 10 cm. mark on the tape will then serve as the starting point for making the third measurement, that of the width of board $c$; for this purpose a length corresponding to the width of this board, e. g. 8 centimeters, is uncoiled from out of casing element 4'.

Thus, the length of tape actually uncoiled at each individual measurement will at any time be substantially equal to the length corresponding to said measurement, independently of any of the lengths that may have been measured off during the previous measuring operations.

To facilitate the procedure, the flexible attachment elements such as 2 and 2' may be marked with a few additional graduations as extensions of the calibrations of the tape itself.

It will be noted that the above described arrangement makes it possible to reduce by half the length of tape used. Thus, for measuring a total length of 10 meters for example, it will be necessary only to provide a tape 5 meters long, provided with calibrations extending respectively from 0 to 5 m. and 5 to 10 meters, the measurements from 0 to 5 meters being effected by coiling up the tape in the direction of arrow F, and the measurements from 5 to 10 meters being effected by coiling up the tape in the opposite direction indicated by arrow F'. The respective calibrations (0 to 5 m. and 5 m. to 10 m.), instead of being marked off along the opposite edges of a common side of the tape measured as indicated in Fig. 3, may be provided on the opposite faces of the tape. Further, four different calibrated scales may be provided, e. g. from 0 to 5 meters and from 5 meters to 10 meters on one side of the tape, and from 10 m. to 15 m. and from 15 to 20 m. on the opposite face.

It will be understood that many modifications may be made in the details of the single embodiment of the invention illustrated, and various known attachments may be adapted thereto for improving the operation thereof without exceeding the scope of the invention as defined in the ensuing claims. Thus, an automatic counting device may be used to totalize the lengths of tape successively uncoiled; various types of reference markers may be provided, and brake means may be provided for blocking the tape at any adjusted position.

What I claim is:

1. A tape measure comprising a flexible calibrated band, a pair of mutually independent housing elements, and spring coiling means in each element and connected to a respective end of said band, each spring coiling means urging said band into a coiled condition within the respective related housing element, and cooperating interfitting means on said housing elements adapted to provide a complete housing for said tape in the fully coiled condition thereof the relative spacing between said elements being a function of the uncoiled band.

2. A tape measure as claimed in claim 1, which comprises means for locking said housing elements in the interfitted condition of said cooperating means.

3. A tape measure as claimed in claim 2 wherein said locking means comprise a tracer point serving as a cotter pin for locking said elements in the interfitted condition thereof.

References Cited in the file of this patent

UNITED STATES PATENTS

| | | |
|---|---|---|
| 748,094 | Parker | Dec. 29, 1903 |
| 1,994,339 | Farrand | Mar. 12, 1935 |
| 2,346,479 | Fatkin | Apr. 11, 1944 |
| 2,459,554 | Tomko | Jan. 18, 1949 |